United States Patent
Cheng et al.

(10) Patent No.: US 9,104,549 B2
(45) Date of Patent: Aug. 11, 2015

(54) DATA STORAGE DEVICE AND METHOD FOR FLASH BLOCK MANAGEMENT

(75) Inventors: Chang-Kai Cheng, Hsinchu (TW); Yen-Hung Lin, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 178 days.

(21) Appl. No.: 13/484,218

(22) Filed: May 30, 2012

(65) Prior Publication Data

US 2013/0311702 A1     Nov. 21, 2013

Related U.S. Application Data

(63) Continuation of application No. 13/474,801, filed on May 18, 2012.

(51) Int. Cl.
*G06F 12/00* (2006.01)
*G06F 12/02* (2006.01)

(52) U.S. Cl.
CPC .... *G06F 12/0246* (2013.01); *G06F 2212/7205* (2013.01); *G06F 2212/7211* (2013.01)

(58) Field of Classification Search
CPC .................. G06F 12/0246; G06F 2212/7211; G06F 2212/7205
USPC ................................................. 711/103, 115
See application file for complete search history.

(56) References Cited

U.S. PATENT DOCUMENTS

| | | | | |
|---|---|---|---|---|
| 6,973,531 B1 * | 12/2005 | Chang et al. | | 711/103 |
| 7,254,668 B1 * | 8/2007 | Chang et al. | | 711/103 |
| 7,797,481 B2 * | 9/2010 | Lee et al. | | 711/103 |
| 8,180,953 B2 | 5/2012 | Chu | | |
| 8,300,463 B2 * | 10/2012 | Park et al. | | 365/185.09 |
| 2004/0193774 A1 * | 9/2004 | Iwata et al. | | 711/1 |
| 2005/0204187 A1 * | 9/2005 | Lee et al. | | 714/8 |
| 2007/0260811 A1 * | 11/2007 | Merry et al. | | 711/103 |
| 2008/0195798 A1 * | 8/2008 | Lee et al. | | 711/103 |

(Continued)

FOREIGN PATENT DOCUMENTS

TW           201027420          7/2010

OTHER PUBLICATIONS

Jesung Kim et.al. IEEE, technical disclosure, "A Space Efficient Flash Translation Layer for Compact Flash Systems," Apr. 2001 Section I-III.*

(Continued)

*Primary Examiner* — Yaima Rigol
*Assistant Examiner* — Tasnima Matin
(74) *Attorney, Agent, or Firm* — McClure, Qualey & Rodack, LLP

(57) ABSTRACT

A data storage device is coupled to a host and includes a flash memory and a controller. The flash memory comprises a spare block pool and a data block pool, wherein the spare block pool comprises a plurality of spare blocks, and the data block pool comprises a plurality of data blocks, wherein a spare block count indicates a total number of the spare blocks. The controller receives target data from the host, writes the target data to a current data block, determines whether a current programming page is the first page of the current data block, determines whether the spare block count is less than a spare block count threshold when the current programming page is the first page, and sets data move information for a data merge process when the spare block count is less than the spare block count threshold.

14 Claims, 9 Drawing Sheets

(56) References Cited

U.S. PATENT DOCUMENTS

| | | | |
|---|---|---|---|
| 2009/0089485 A1* | 4/2009 | Yeh | 711/103 |
| 2009/0182936 A1* | 7/2009 | Lee | 711/103 |
| 2010/0017555 A1* | 1/2010 | Chang et al. | 711/103 |
| 2010/0115188 A1* | 5/2010 | Lee et al. | 711/103 |
| 2010/0228907 A1* | 9/2010 | Shen | 711/103 |
| 2010/0235605 A1* | 9/2010 | Perry et al. | 711/170 |
| 2010/0262765 A1* | 10/2010 | Cheon et al. | 711/103 |
| 2010/0268871 A1* | 10/2010 | Lee et al. | 711/103 |
| 2011/0302476 A1* | 12/2011 | Lee et al. | 714/763 |
| 2012/0221782 A1* | 8/2012 | Lee et al. | 711/103 |
| 2012/0284587 A1* | 11/2012 | Yu et al. | 714/773 |
| 2012/0331216 A1* | 12/2012 | Lin et al. | 711/103 |
| 2013/0097362 A1* | 4/2013 | Tan et al. | 711/103 |

OTHER PUBLICATIONS

English language machine translation of TW 201027420 (published Jul. 16, 2010).

\* cited by examiner

US 9,104,549 B2

DATA STORAGE DEVICE AND METHOD FOR FLASH BLOCK MANAGEMENT

CROSS REFERENCE TO RELATED APPLICATIONS

This application is a Continuation of pending application Ser. No. 13/474,801, filed on May 18, 2012, the entirety of which is incorporated by reference herein.

BACKGROUND OF THE INVENTION

1. Field of the Invention

The invention relates to flash memories, and more particularly to management of blocks of flash memories.

2. Description of the Related Art

A flash memory is a non-volatile computer storage chip that can be electrically erased and reprogrammed A flash memory is primarily used in memory cards, USB flash drives, solid-state drives, and similar products, for general storage and transfer of data. Example devices for applications of a flash memory include personal computers, PDAs, digital audio players, digital cameras, mobile phones, video games, and so on. In addition to being non-volatile, flash memory offers fast read access times, as fast as dynamic RAM, although not as fast as static RAM or ROM. A flash memory now costs far less than byte-programmable EEPROM and has become the dominant memory type for when a significant amount of non-volatile, solid state storage is needed. Thus, a method for appropriately managing a flash memory is required to improve the performance of the flash memory.

BRIEF SUMMARY OF THE INVENTION

The invention provides a data storage device. In one embodiment, the data storage device is coupled to a host, and comprises a flash memory and a controller. the flash memory comprises a spare block pool and a data block pool, wherein the spare block pool comprises a plurality of spare blocks, and the data block pool comprises a plurality of data blocks, wherein a spare block count indicates a total number of the spare blocks. The controller receives target data from the host, writes the target data to a current data block, determines whether a current programming page is the first page of the current data block, determines whether the spare block count is less than a spare block count threshold when the current programming page is the first page, and sets data move information for a data merge process when the spare block count is less than the spare block count threshold.

The invention provides a method for flash block management. In one embodiment, a data storage device is coupled to a host and comprises a flash memory and a controller, the flash memory comprises a spare block pool and a data block pool, the spare block pool comprises a plurality of spare blocks, the data block pool comprises a plurality of data blocks, and a spare block count indicates a total number of the spare blocks. First, target data is received from the host. The target data is then written to a current data block. Whether a current programming page is the first page of the current data block is then determined Whether the spare block count is less than a spare block count threshold is then determined when the current page is the first page. Data move information for a data merge process is then set when the spare block count is less than the spare block count threshold.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
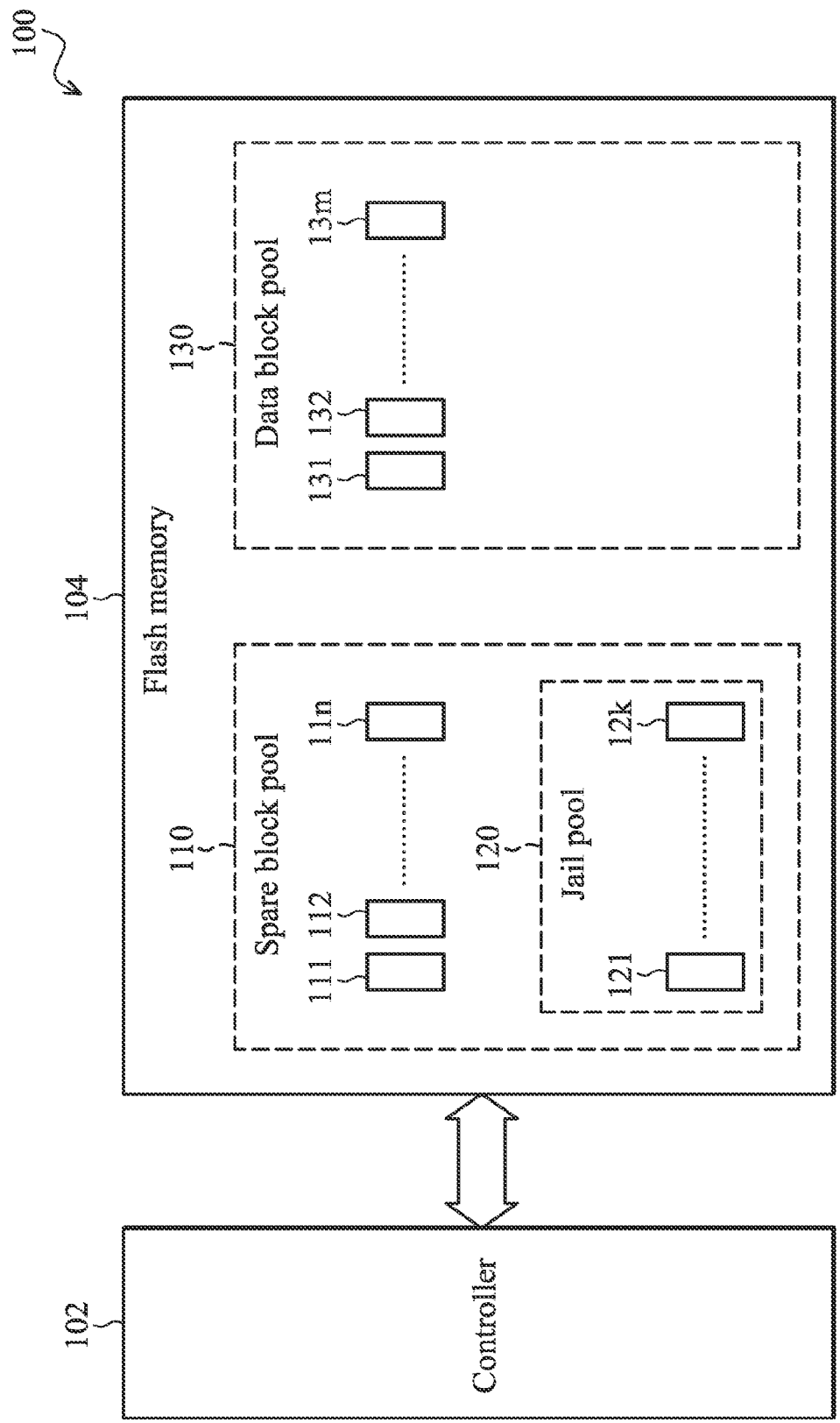
FIG. 1 is a block diagram of a data storage device according to the invention.

Referring to FIG. 1, a block diagram of a data storage device 100 according to the invention is shown. In one embodiment, the data storage device 100 comprises a controller 102 and a flash memory 104. The flash memory 104 comprises a plurality of blocks for data storage. In one embodiment, the flash memory 104 comprises a spare block pool 110 and a data block pool 130. The spare block pool 110 comprises a plurality of spare blocks 111~11n storing invalid data. The data block pool 130 comprises a plurality of blocks 131~13m storing data. In one embodiment, the data storage device 100 is coupled to a host. The controller must manage the blocks of the flash memory 104 according to commands sent by the host. The flash memory 104 specifies a block according to a physical address, and the host specifies a block according to a logical address. The controller 102 therefore must convert logical addresses sent by the host to physical addresses. In one embodiment, the controller 102 records a corresponding relationship between logical addresses and physical addresses of the blocks in an address link table.

Each of the data blocks 131~13m comprises a plurality of pages. When data is stored in a page of a data block, the page is referred to as a data page. When a data page has a corresponding logical address, the data page is referred to as a valid page. In one embodiment, the controller 102 respectively counts a total number of valid pages of each of the data blocks 131~13m to obtain a valid page number, and records the valid page numbers of the data blocks 131~13m in a valid count table. In addition, a frequency at which a block is erased is referred to as an erase count of the block. In one embodiment, the controller 102 also records the erase counts of all of the blocks of the flash memory 104 in an erase count table.

Figure 2:
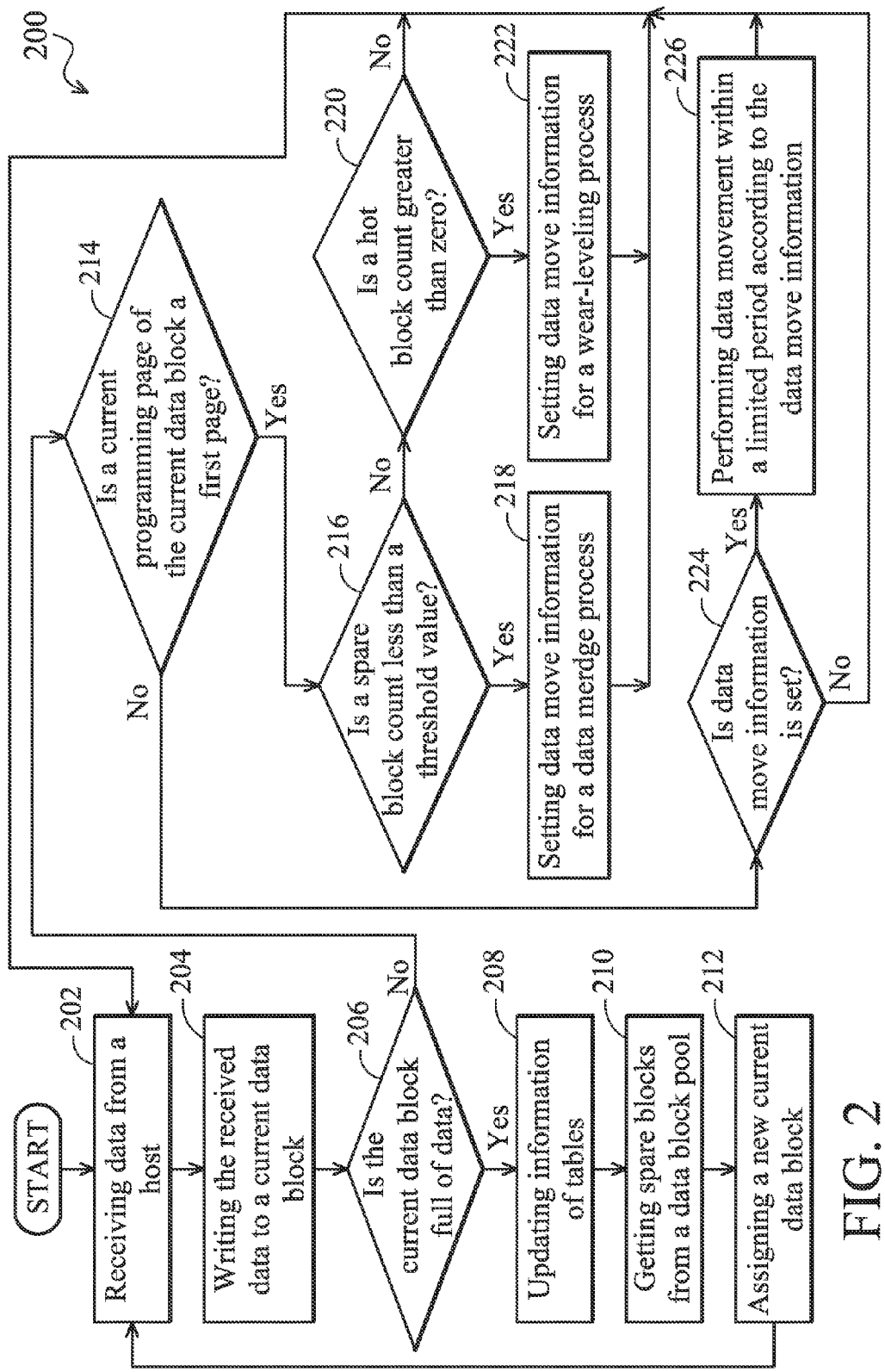
FIG. 2 is a flowchart of a method for managing blocks of a flash memory according to the invention.
Figure 3:
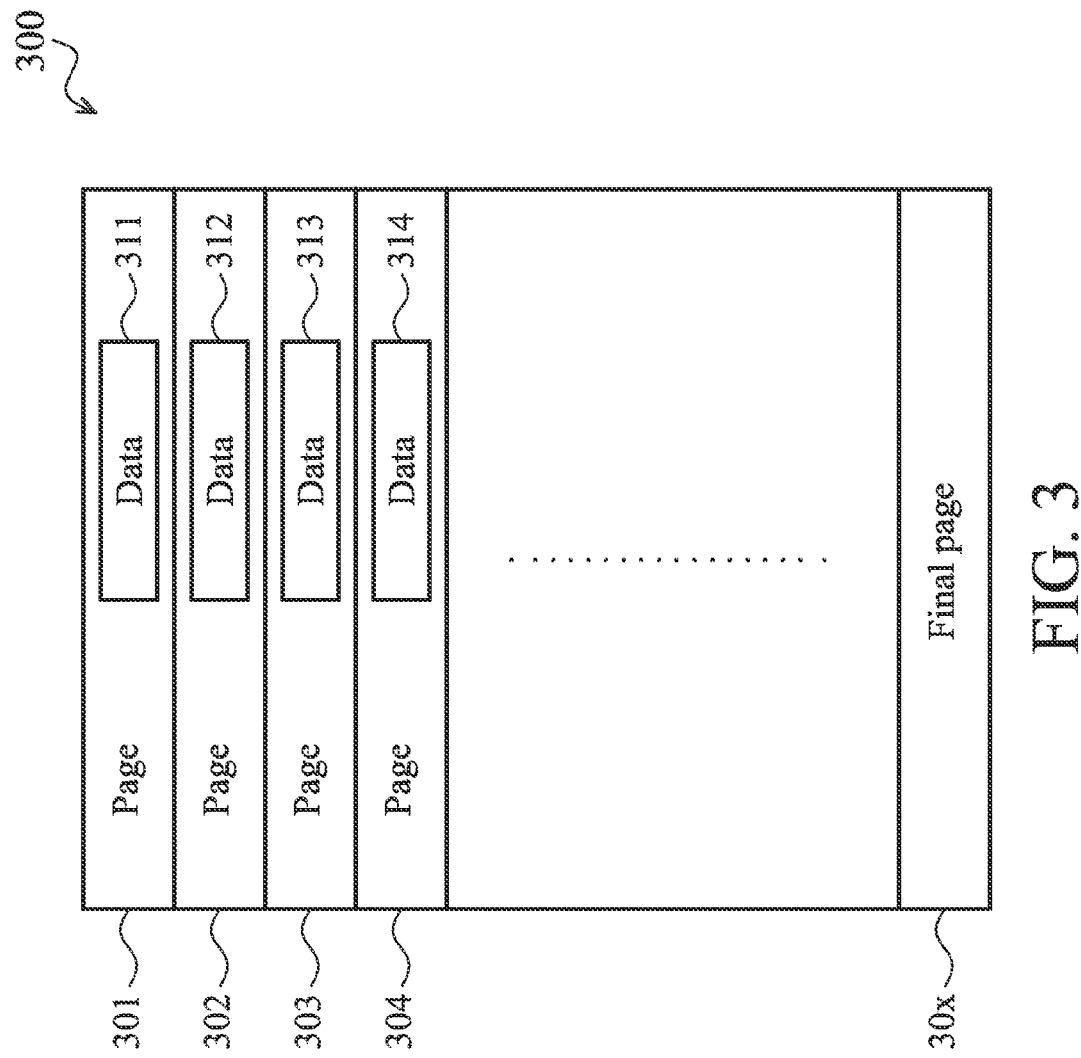
FIG. 3 is a schematic diagram of a current data block of a flash memory according to the invention.

Referring to FIG. 2, a flowchart of a method 200 for managing blocks of the flash memory 104 according to the invention is shown. When the host sends a target data to be written to the data storage device 100, the controller receives the target data (step 202), and writes the target data to a current data block (step 204). Referring to FIG. 3, a schematic diagram of a current data block 300 of the flash memory 104 according to the invention is shown. The current data block 300 comprises a plurality of pages. The pages of the current data block 300 may be used to store data pages corresponding to different logical addresses. For example, data 311 stored in page 301 may correspond to a logical address L1, data 312 stored in page 302 may correspond to a logical address L2, and data 313 stored in page 303 may correspond to a logical address L3.

After the target data is written to the current data block, the controller 102 then determines whether the current data block is full of data (step 206). In one embodiment, when controller 102 current programming page is the final page of the current data block, the controller 102 determines that the current data block is full. The controller 102 then updates a plurality of tables according to the information of the current data block (step 208). In one embodiment, the updated tables comprise an address link table and a valid page count table. Because the data stored in the pages of the current data block respectively corresponds to different logical addresses, the controller 102 must write the mapping relationship between the physical addresses of the current data block and the logical addresses of the data stored therein to the address link table. In addition, a page would be marked as an invalid page if host cancel or new that page. The controller 102 must calculate a total number of valid pages in a block to determine a valid page count of that block, and then writes the valid page count to the valid page count table. After more data canceling and/or renewing, some data blocks in the data block pool 130 store no valid page and their valid page counts will be set to zero. Then, these blocks which valid page count are zero will be set as spare blocks and transferred from a data block pool 130 to the spare block pool 110 (step 210). The step 210 will be further illustrated in detail with FIG. 4. The controller 102 then obtains a spare block from the spare block pool 110 and then assigns the spare block to be a current data block for receiving new data sent by the host (step 212).

Figure 5:
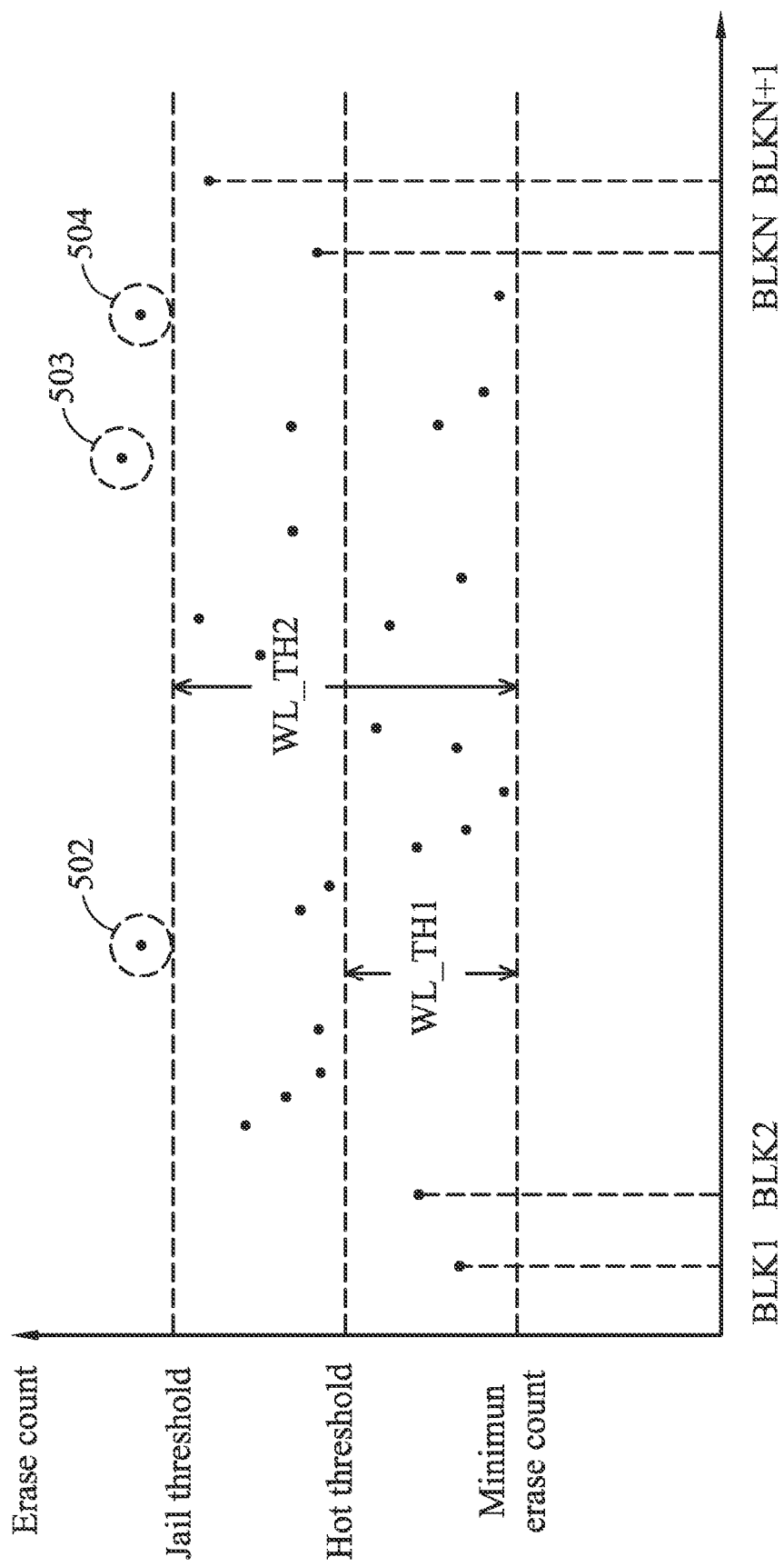
FIG. 5 is a schematic diagram of calculation of a jail threshold value and a hot threshold value according to the invention.

Referring to FIG. 5, a schematic diagram of calculation of a jail threshold value and a hot threshold value according to the invention is shown. All blocks of the flash memory 104 has an erase count. And the erase count of a block would be add one when controller set the block as a spare block and put the block to spare block pool. A minimum erase count of the blocks of the flash memory 104 will increase with time and the block with the minimum erase count would change in some situation. Therefore, the controller 102 will frequently determine the minimum erase count according to changing of the erase counts of all blocks of the flash memory 104. After the minimum erase count is determined, the controller 102 then adds a first difference WL_TH1 to the minimum erase count to obtain a hot threshold value, and adds a second difference WL_TH2 to the minimum erase count to obtain a jail threshold value, as shown in FIG. 5. In one embodiment, the first difference WL_TH1 is less than the second difference WL_TH2. Here the second difference WL_TH2 is greater than the first difference WL_TH1, and the jail threshold value is therefore greater then the hot threshold value. When an erase count of a block is greater than the hot threshold value, the controller 102 determines the block to be a hot block. When an erase count of a block is greater than the jail threshold value, the controller 102 determines the block to be a jail block, and puts the jail block into the jail pool 120 shown in FIG. 1. For example, the blocks 502, 503, and 504 shown in FIG. 5 have erase counts greater than the jail threshold value and are therefore put into the jail pool 120. Although the jail blocks 121~12k are spare blocks, when the controller 102 retrieves a new spare block for storing data from the spare block pool 110, the controller 102 does not retrieve the jail blocks. The erase count of the jail block is therefore prevented from being further increased unless the jail block is released in the future.

Figure 4:
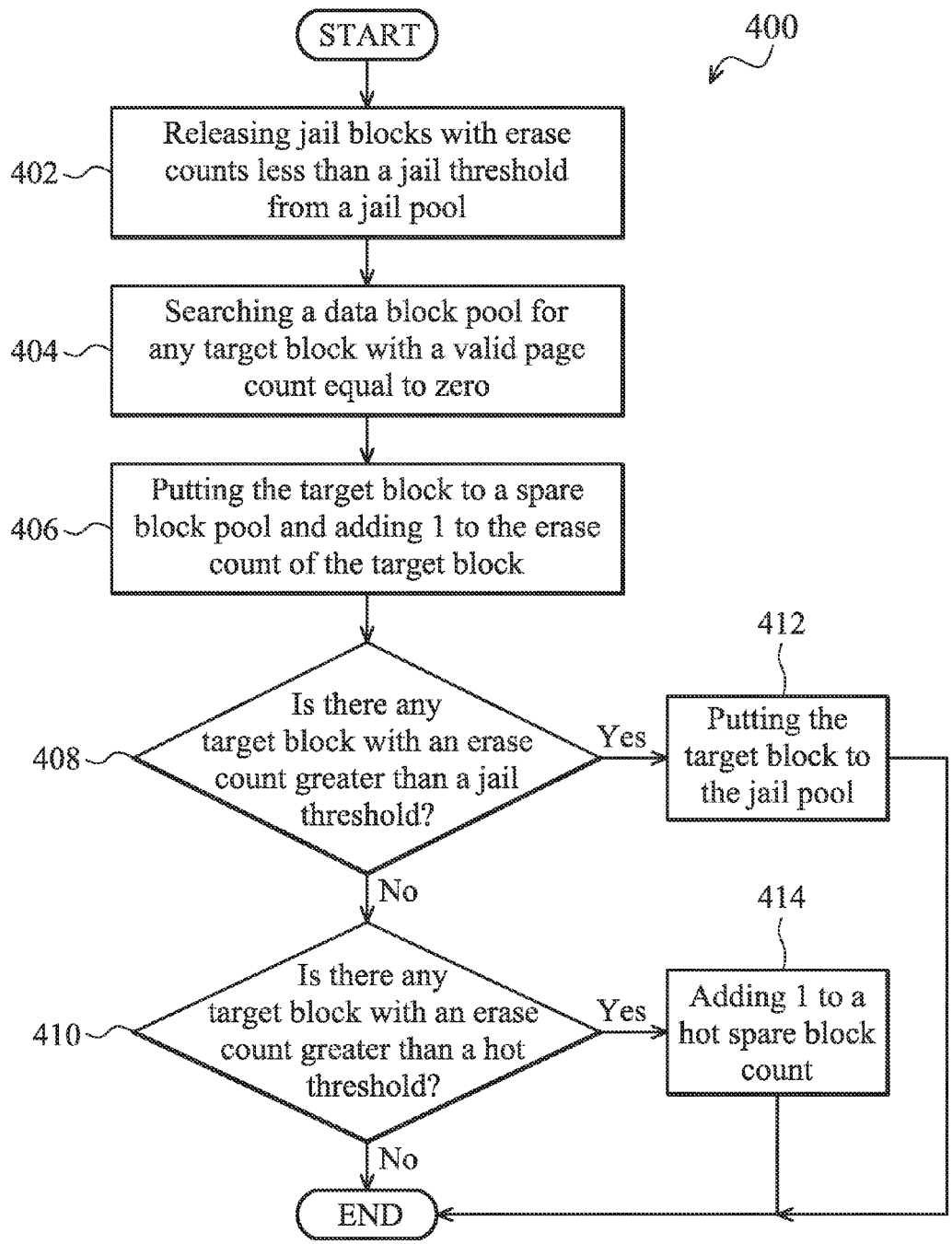
FIG. 4 is a flowchart of a method for getting spare blocks from a data block pool according to the invention.

Referring to FIG. 4, a flowchart of a method 400 for getting spare blocks from the data block pool 130 according to the invention is shown. The method 400 comprises the detailed steps for performing the step 210 of the method 200 shown in FIG. 2. First, the controller 102 determines a minimum erase count from the erase counts of the blocks of the flash memory 104, and calculates a jail threshold value according to the minimum erase count. After updating the jail threshold value, some erase counts of the jail blocks 121~12k in the jail pool 120 may be less than the updated jail threshold value. The controller 102 therefore compares the erase counts of the jail blocks 121~12k of the jail pool 120 with the jail threshold value, and releases the jail block from the jail pool 120 to the spare block pool 110 if its erase count less than the jail threshold value (step 402).

Some of the data blocks 131~13m of the data block pool 130 may comprise no valid data and have a valid page count equal to zero. The controller 102 therefore searches the data block pool 130 for any target block with valid page counts equal to zero (step 404), then puts the target blocks to the spare block pool 110 and adds 1 to the erase counts of the target blocks (step 406). The controller 102 then determines whether there is any erase count of the target block greater than the jail threshold value (step 408). If yes, the controller puts the target block which has a greater erase count than the jail threshold value to the jail pool 120 (step 412). If not, the controller 102 then determines whether there is any erase count of the target block greater than the hot threshold value (step 410). If yes, the controller 102 determines the target block to be a hot block, and then adds the number of the target blocks to the hot block count (step 414).

Referring back to FIG. 2. After the target data is written to the current data block (step 204), the controller 102 then determines whether the current data block is full of data (step 206). If the current data block is not full, the controller 102 determines whether the current programming page is a first page of the current data block (step 214). If yes, for example, the controller is currently programming the page 301 shown in FIG. 3, the first page of the current data block 300, the controller 102 then determines whether a spare block count is less than a spare block count threshold value (step 216). The spare block count indicates a total number of the spare blocks in the spare block pool 110. In one embodiment, the spare block count threshold value is 15. And if a spare block is obtained from the spare block pool 110 and then is erased as a new current data block, the total number of the spare blocks in the spare block pool decreases one. When the spare block count is less than the spare block count threshold value (step 216), the controller 102 sets data move information for a data merge process to initiate the data merge process to increase the spare block count (step 218).

Figure 6:
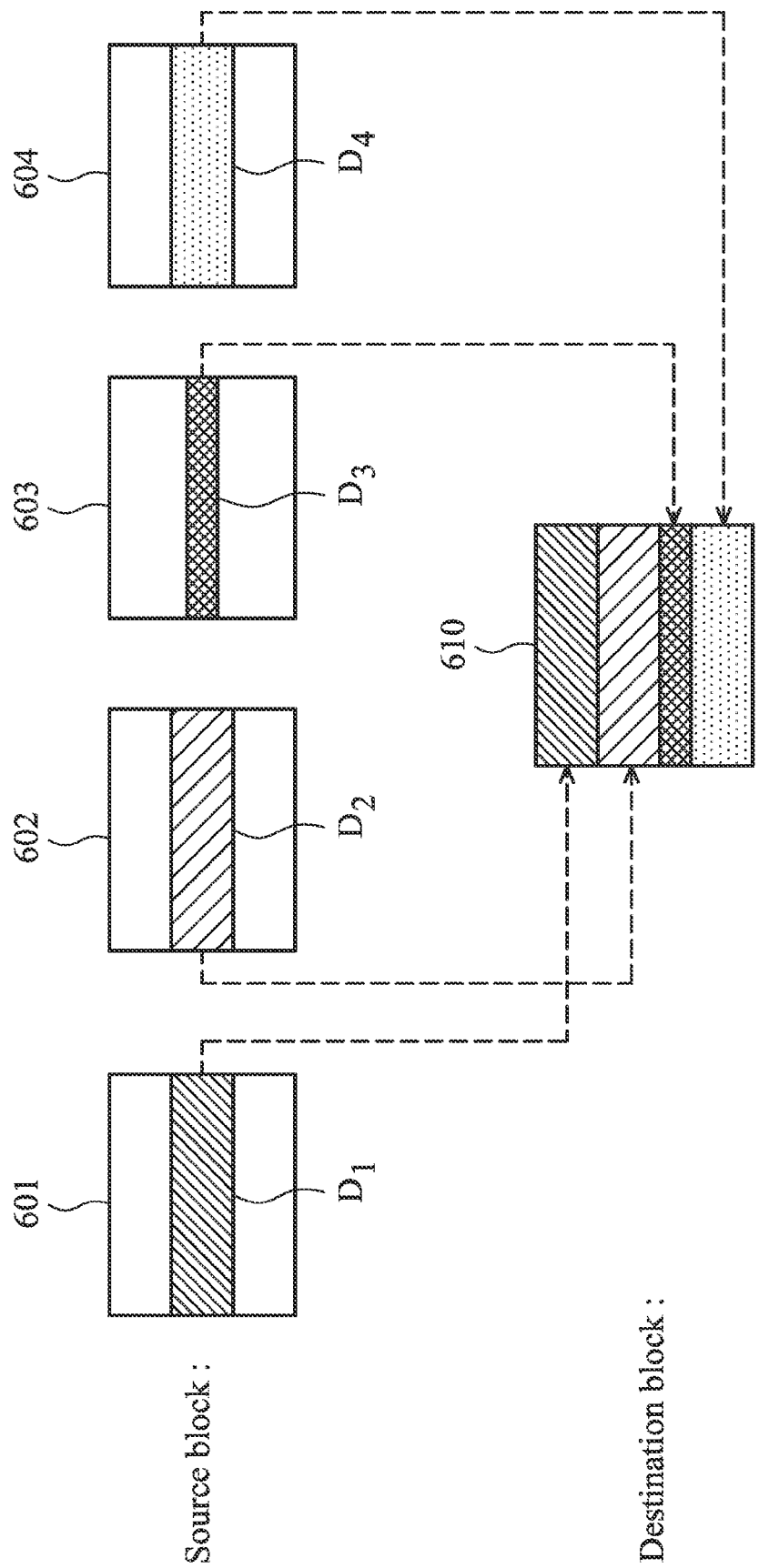
FIG. 6 is a schematic diagram of a data merge process according to the invention.

In one embodiment, the data move information for initiating a data merge process comprises physical addresses of a plurality of source data blocks with data to be merged and a physical address of a destination spare block to which the merged data is written. The controller 102 selects data blocks with minimum valid page counts from the data block pool 130 as the source data blocks, and obtains a spare block as the destination spare block. Referring to FIG. 6, a schematic diagram of a data merge process according to the invention is shown. When the data merge process begins, four source data blocks 601, 602, 603, and 604 with minimum valid page counts are selected from the data block pool 130 and a destination spare block 610 is selected from the spare pool. The controller 102 then erases the destination spare block 610 and merges the valid data D1, D2, D3, and D4 of the source data blocks 601, 602, 603, and 604 in RAM (not shown) to obtain merged data (D1+D2+D3+D4). Then controller 102 writes the merged data (D1+D2+D3+D4) to the destination spare block 610. Finally, the controller 102 puts the source data blocks 601, 602, 603, and 604 to the spare block pool 110, and puts the destination spare block 610 written with the merged data (D1+D2+D3+D4) to the data block pool 130. Therefore, the total number of the spare blocks in the spare block pool will increase to three after the data merge process is performed.

Referring back to FIG. 2. When the current programming page is the first page of the current data block (step 214), and the spare block count is greater, not less, than the spare block count threshold value (step 216), the controller 102 then determines whether a hot block count is greater than zero (step 220). The hot block count indicates a total number of the hot blocks with erase counts that are greater than the hot threshold value in the spare block pool 110. Because the hot blocks have a high erase count, if the spare block pool 110 comprises a greater number of hot blocks, the controller 102 should retrieve a hot block from the spare block pool 110 and proceed with the wear-leveling process with a data block which has the least erase count in the data pool. Thus, when the spare block count is great than the threshold and the hot block count is greater than zero (step 220), the controller 102 sets data move information for a wear-leveling process to initiate the wear-leveling process to decrease the hot block count (step 222).

Figure 7:
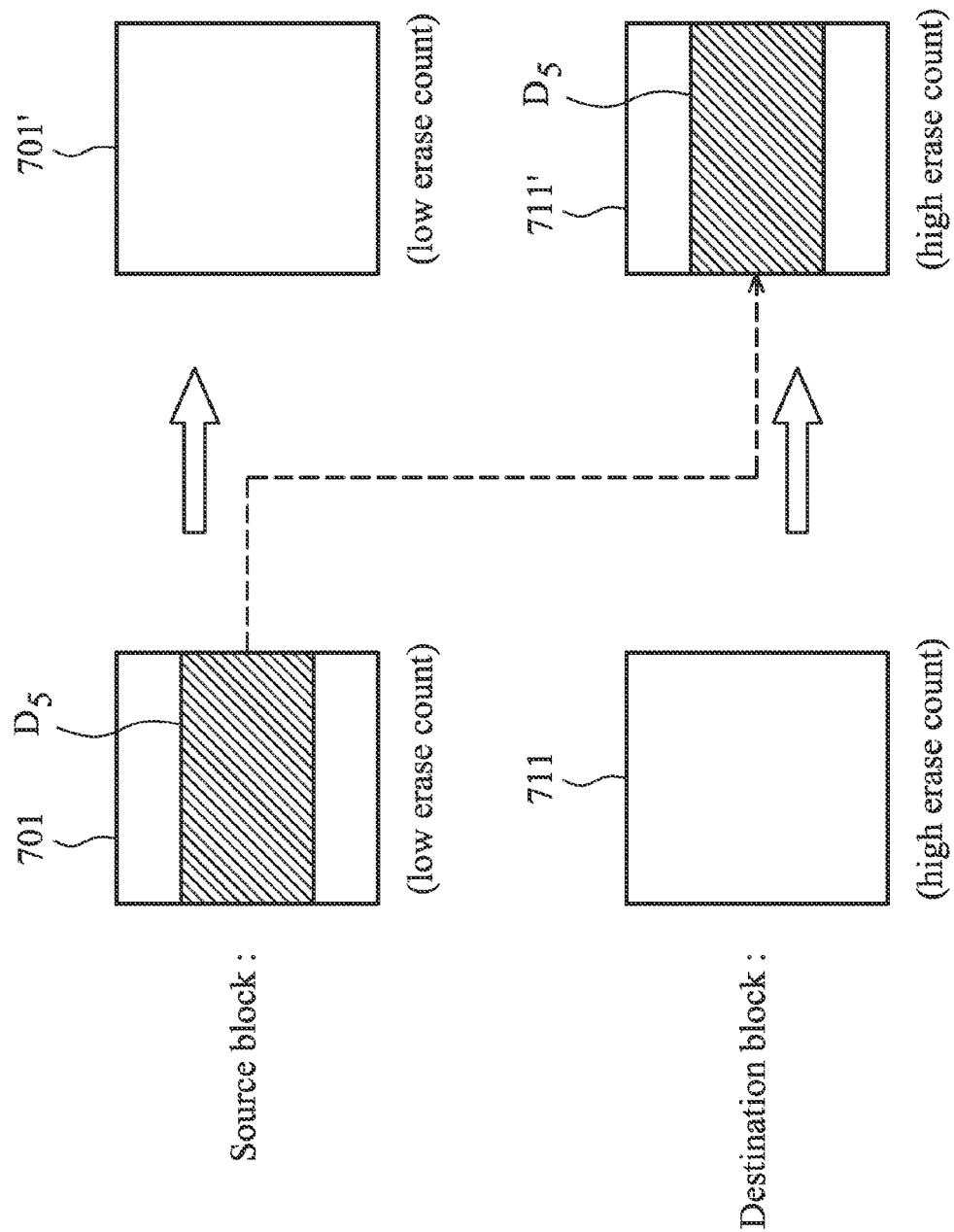
FIG. 7 is a schematic diagram of a wear-leveling process according to the invention.

In one embodiment, the data move information for initiating a wear-leveling process comprises the physical address of at least one source data block with data to be copied and the physical address of at least one destination spare block to which the copied data is written. When there is a plurality of hot blocks in the spare block pool 110, the controller 102 determines the hot blocks to be the destination spare blocks. Because the data blocks with low erase counts store data with low updating probability, the controller 102 selects data blocks with minimum erase counts from the data block pool 130 as the source data blocks. Referring to FIG. 7, a schematic diagram of a wear-leveling process according to the invention is shown. When the wear-leveling process begins, a source data block 701 with a minimum erase count is selected from the data block pool 130 and a destination spare block 711 is selected from the spare block pool 110. The controller 102 then erases the destination spare block 711 and writes the copied data D5 to the destination spare block 711'. Then the source data block 701' with a low erase count is put into the spare block pool 110, and the destination spare block 711' with a high erase count is put from the spare block pool 110 to the data block pool 130. The total number of the hot blocks in the spare block pool 110 therefore will decrease one after the wear-leveling process is performed.

Refer back to FIG. 2. When a current programming page to which the target data is written is not a first page of the current data block (step 214), the controller 102 determines whether the data move information is set (step 224). If the data move information for a data merge process or a wear-leveling process is set, the controller 102 performs a portion of the data merge process or the wear-leveling process according to the data move information within a limited time period (step 226). The limited time period is determined by a standard for data transmission requirement between the host and the data storage device 104. For example, after the host sends a write command and the target data to the controller 102, the host must receive a response information about execution completion of the write command within a limited time period of 100 ms~300 ms, and the controller 102 can only perform a portion of the data merge process or the wear-leveling process during the limited time period.

Due to the limited time period, the controller 102 slices the data move operation of the data merge process or the wear-leveling process into a plurality of partial data move operations. After a new target data is written to a current programming page of the current data block (step 204), if the current programming page is not a first page of the current data block (step 214), one of the partial data move operations of the data merge process or the wear-leveling process is performed during the limited time period. For example, as shown in FIG. 6, when the data move information of a data merge process is set (step 224), the controller 102 selects a plurality of target pages with valid data from the source data blocks 601, 602, 603, and 604, and copies the valid data from the target pages to the destination spare block 610 within the limited time period. For example, as shown in FIG. 7, when the data move information of a wear-leveling process is set (step 224), the controller 102 selects a plurality of target pages from the source data block 701, and copies data from the target pages to the destination spare block 711 within the limited time period. After a few write commands are executed, the data move operation of the data merge process or the wear-leveling process is also completed.

Figure 8:
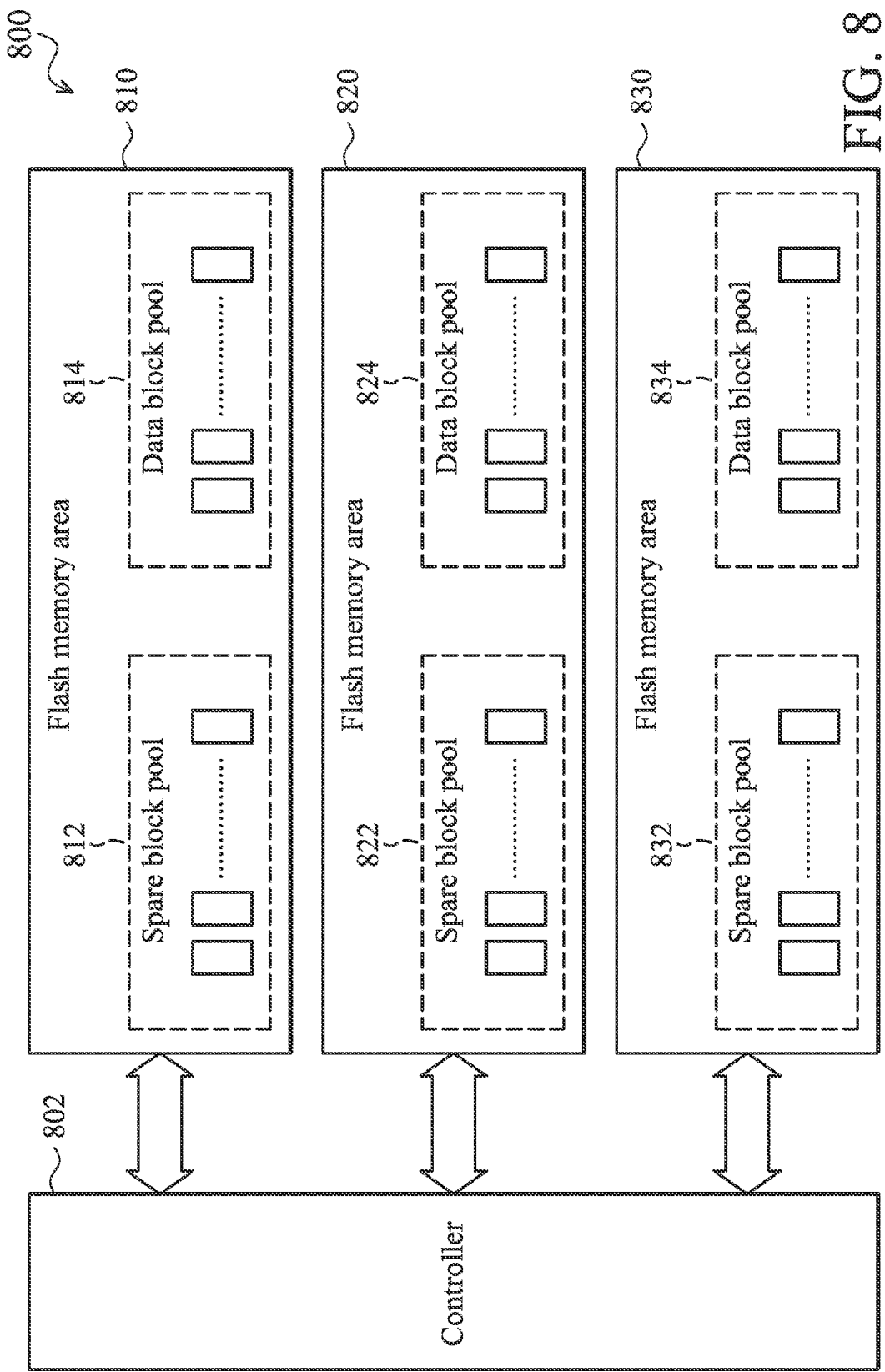
FIG. 8 is a block diagram of a data storage device capable of switching memory areas according to the invention.

Referring to FIG. 8, a block diagram of a data storage device 800 capable of switching memory areas according to the invention is shown. The data storage device 800 comprises a controller 802 and a plurality of flash memory areas 810, 820, and 830. In one embodiment, the flash memory areas 810, 820, and 830 are respective flash memory chips. For example, the flash memory area 810 is an SLC flash memory, the flash memory area 820 is an MLC flash memory, and the flash memory area 830 is a TLC flash memory. In another embodiment, the flash memory areas are memory partitions of a single flash memory chip. Each of the flash memory areas 810, 820, and 830 comprises a spare block pool and a data block pool. The controller 802 independently manages the blocks of each of the flash memory areas 810, 812, and 814. For example, the controller 802 performs a data merge process or a wear-leveling process between the spare block pool and the data block pool of a single flash memory area. When block management is performed, the controller 802 does not exchange data between the blocks of a flash memory area and another flash memory area.

Figure 9:
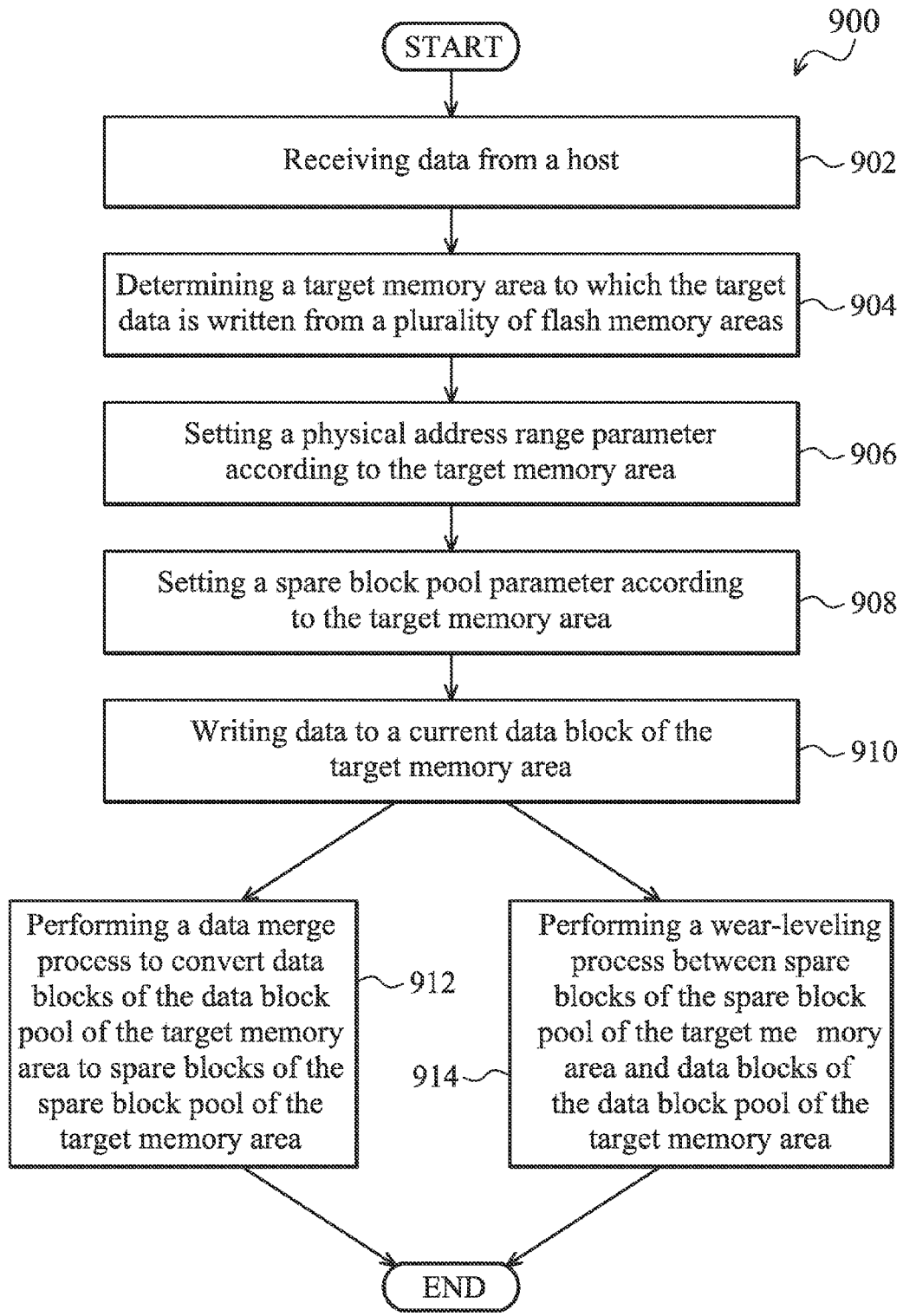
FIG. 9 is a flowchart of a method for managing blocks of a plurality of flash memory areas according to the invention.

Referring to FIG. 9, a flowchart of a method 900 for managing blocks of the flash memory areas 810, 820, and 830 according to the invention is shown. First, the controller 802 receives target data from a host (step 902). The controller 802 then determines a target memory area to which the target data is written from a plurality of flash memory areas 810, 820, and 830 (step 904). The controller 802 then sets a physical address range parameter according to the target memory area (step 906). In one embodiment, the physical address range parameter comprises a start address parameter and an end address parameter, and the controller 802 sets the start address parameter to be a start address of the target memory area, and sets the end address parameter to be an end address of the target memory area. The controller 802 then sets a spare block pool parameter according to the target memory area (step 908). In one embodiment, the controller 802 records the physical addresses of the spare blocks of the spare block pool of the target memory area to the spare block pool parameter. The controller 802 then writes the target data to a current data block of the target memory area (step 910).

The controller 802 then performs a data merge process or a wear-leveling process on the blocks of the target memory area according to the steps 206~226 of the method 200 shown in FIG. 2. In other words, the controller 802 performs the data merge process on the blocks of the data block pool of the target memory area (step 912), or performs the wear-leveling process between the spare blocks of the spare block pool of the target memory area and the data blocks of the data block pool of the target memory area (step 914). Setting of the data move information of the data merge process of step 912 or the wear-leveling process of step 914 is identical to those of the steps 218 or 222, and performing of the data merge process of step 912 or the wear-leveling process of step 914 is also identical to that of the step 226. The controller 802 can therefore independently manage the blocks of the target memory area without intervening block management of other flash memory areas.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, coupled to a host, comprising:
    a flash memory, comprising a spare block pool and a data block pool, wherein the spare block pool comprises a plurality of spare blocks, and the data block pool comprises a plurality of data blocks, wherein a spare block count indicates a total number of the spare blocks; and
    a controller, receiving target data from the host, writing the target data to a current data block, determining whether a current programming page is the first page of the current data block, determining whether the spare block count is less than a spare block count threshold when the current programming page is the first page, and setting data move information for a data merge process when the spare block count is less than the spare block count threshold, wherein when the current page is not the first page, the controller determines whether the data move information is set, and when the data move information is set, the controller performs a data merge process according to the data move information within a limited time period, wherein the limited time period is determined by a standard for data transmission between the data storage device and the host.

2. The data storage device as claimed in claim 1, wherein the data move information for the data merge process comprises physical addresses of a plurality of source data blocks with data to be merged and physical addresses of a destination spare block to which the merged data is written.

3. The data storage device as claimed in claim 2, wherein when the controller sets the data move information for the data merge process, the controller selects the data blocks with minimum valid page counts from the data block pool as the source data blocks, obtains a destination spare block from the spare block pool, and erases the destination spare block.

4. The data storage device as claimed in claim 3, wherein the data move information for the data merge process comprises physical addresses of a plurality of source data blocks and a destination spare block, and when the controller performs data merge process, the controller merges data stored in the source data blocks to obtain merged data, writes the merged data to the destination spare block.

5. The data storage device as claimed in claim 4, wherein when the controller performs a data merge process within the limited time period, the controller selects a plurality of target pages with valid data from the source data blocks, and copies the valid data from the target pages to the destination spare block within the limited time period.

6. The data storage device as claimed in claim 4, wherein after the data merge process is completed, the controller further puts the source data blocks to the spare block pool, puts the destination spare block to the data block pool, and adds a total number of the source data blocks to the spare block count.

7. The data storage device as claimed in claim 1, wherein the spare block count threshold is 15.

8. A method for flash block management, wherein a data storage device is coupled to a host and comprises a flash memory and a controller, the flash memory comprises a spare block pool and a data block pool, the spare block pool comprises a plurality of spare blocks, the data block pool comprises a plurality of data blocks, and a spare block count indicates a total number of the spare blocks, the method comprising:
    receiving target data from the host;
    writing the target data to a current data block;
    determining whether a current programming page is the first page of the current data block;
    determining whether the spare block count is less than a spare block count threshold when the current page is the first page;
    setting data move information for a data merge process when the spare block count is less than the spare block count threshold;
    when the current page is not the first page, determining whether the data move information is set; and
    when the data move information is set, performing a data merge process according to the data move information within a limited time period, wherein the limited time period is determined by a standard for data transmission between the data storage device and the host.

9. The method as claimed in claim 8, wherein the data move information for the data merge process comprises physical addresses of a plurality of source data blocks with data to be merged and physical addresses of a destination spare block to which the merged data is written.

10. The method as claimed in claim 9, wherein setting of the data move information for the data merge process comprises:
    selecting the data blocks with minimum valid page counts from the data block pool as the source data blocks;
    obtaining a destination spare block from the spare block pool; and
    erasing the destination spare block.

11. The method as claimed in claim 8, wherein the data move information for the data merge process comprises physical addresses of a plurality of source data blocks and a destination spare block, and performing of the data merge process comprises:
    merging data stored in the source data blocks to obtain merged data;
    writing the merged data to the destination spare block; and
    putting the source data blocks to the spare block pool.

12. The method as claimed in claim 11, wherein performing of a portion of the data merge process within the limited time period comprises:

selecting a plurality of target pages with valid data from the source data blocks; and copying the valid data from the target pages to the destination spare block within the limited time period.

13. The method as claimed in claim 11, wherein the method further comprises:

after the data merge process is completed, putting the source data blocks to the spare block pool, putting the destination spare block to the data block pool, and adding a total number of the source data blocks to the spare block count.

14. The method as claimed in claim 8, wherein the spare block count threshold is 15.

* * * * *